Figure 4:
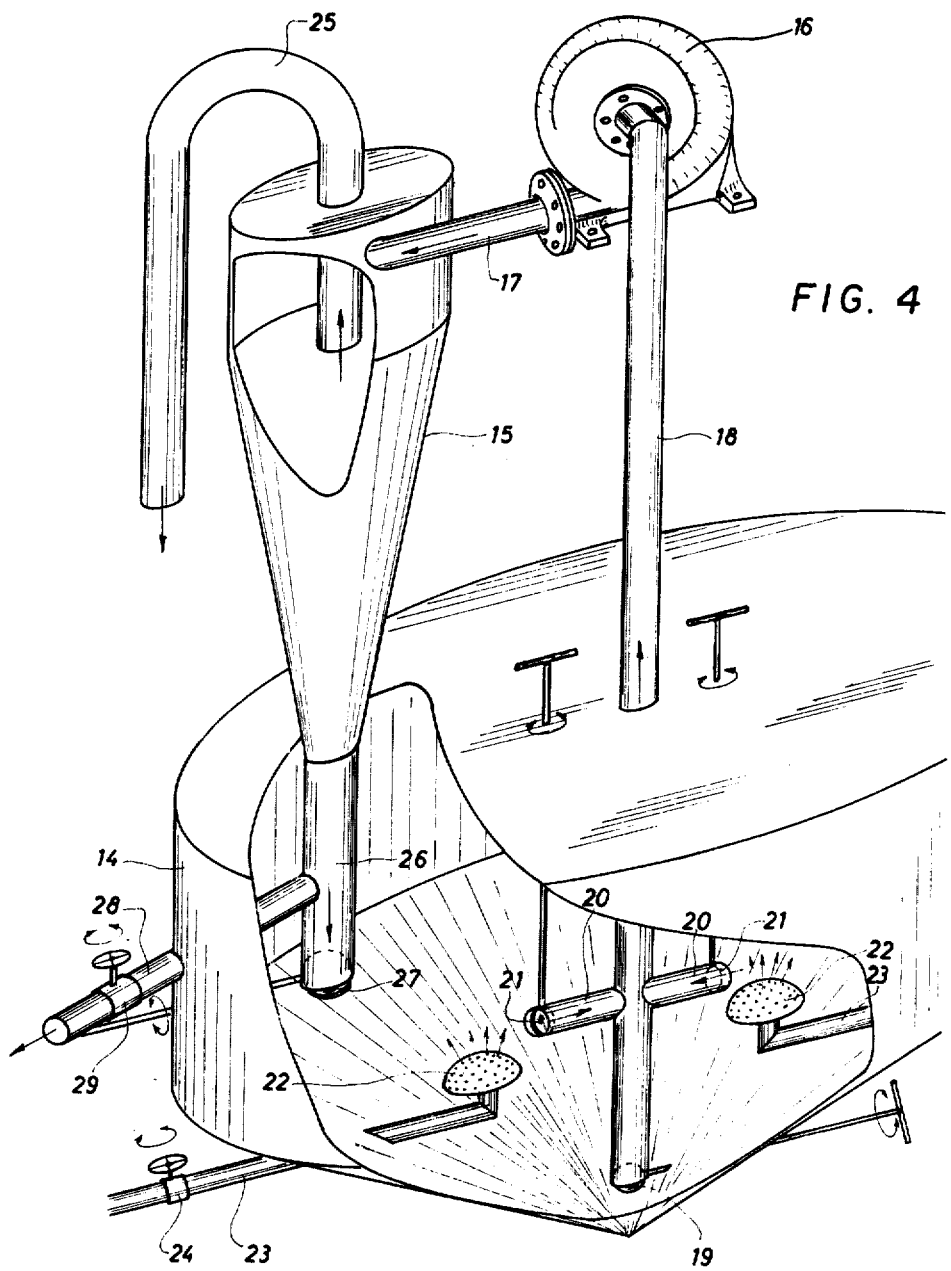

United States Patent [19]

Claes

[11] 3,881,934

[45] May 6, 1975

[54] REMOVAL OF DISSOLVED PRODUCTS FROM A PRECIPITATE

[75] Inventor: Frans Henri Claes, Mortsel, Belgium

[73] Assignee: Agfa-Gevaert N.V., Mortsel, Belgium

[22] Filed: June 4, 1971

[21] Appl. No.: 150,030

[30] Foreign Application Priority Data
June 5, 1970 United Kingdom............... 27325/70

[52] U.S. Cl................................... 96/114.7; 96/94
[51] Int. Cl............................................... G03c 1/02
[58] Field of Search ................ 210/84; 96/94, 114.7

[56] References Cited
UNITED STATES PATENTS

| | | | |
|---|---|---|---|
| 2,005,837 | 6/1935 | Arens | 96/94 |
| 2,179,919 | 11/1939 | Carr et al. | 210/84 |
| 2,401,051 | 5/1946 | Crouse et al. | 96/94 |
| 2,614,928 | 10/1952 | Yutzy et al. | 96/94 |
| 2,781,910 | 2/1957 | Fontein | 210/84 |
| 3,129,173 | 4/1964 | Schulze | 210/84 |
| 3,707,378 | 12/1972 | Motohiro et al. | 96/94 |

*Primary Examiner*—David Klein
*Assistant Examiner*—John L. Goodrow
*Attorney, Agent, or Firm*—William J. Daniel

[57] ABSTRACT

A method of concentrating a dispersion of solid material in a liquid in which the solid material has been precipitated and which contains a dissolved substance or dissolved substances used or produced in the formation of the precipitate, which method comprises introducing the dispersion continuously under pressure into a radially symmetrical chamber provided with discharge outlets, so as to maintain within the chamber a liquid vortex, said discharge outlets being situated so that a dispersion more concentrated than the feed continuously discharges through at least one said outlet and liquid or a dispersion less concentrated than the feed continuously discharges through the other or through at least one other outlet.

The method is preferably applied for freeing a silver halid hydrophilic colloid dispersion from by-products produced in its preparation and/or flocculation.

12 Claims, 5 Drawing Figures

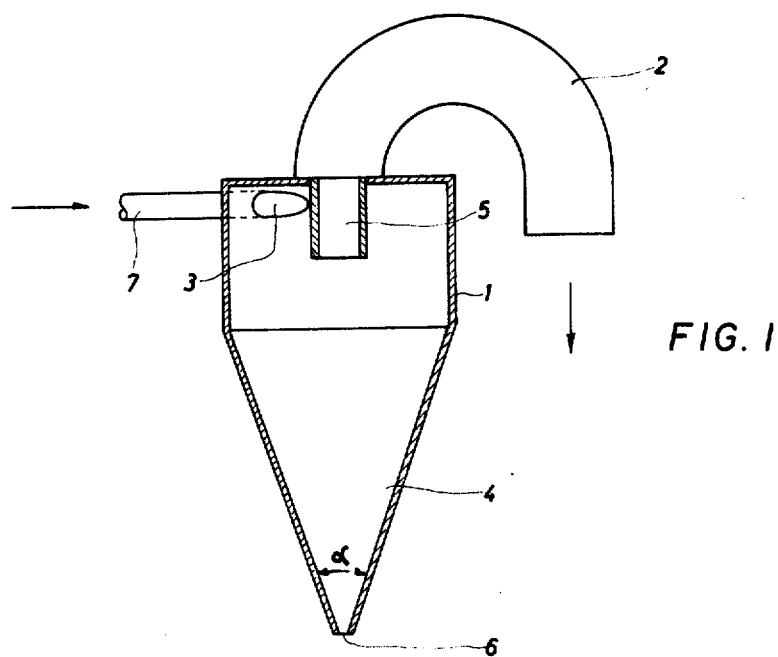
FIG. 1
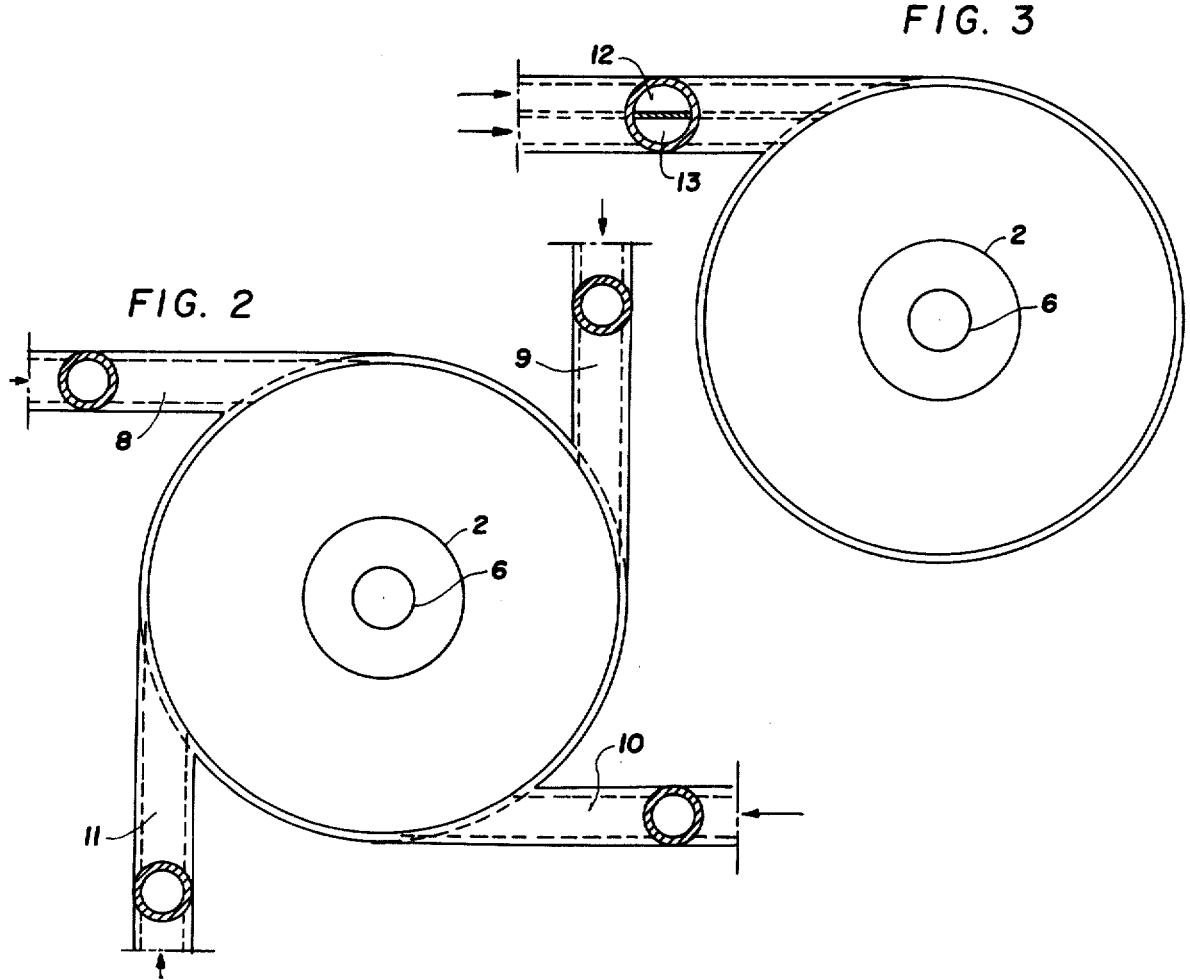
FIG. 2
FIG. 3

REMOVAL OF DISSOLVED PRODUCTS FROM A PRECIPITATE

This invention relates to a process for the continuous removal of dissolved products produced or used in the formation of a precipitate e.g. of light-sensitive silver halide.

During the preparation of light-sensitive silver halide at the end of the ripening stage, the photographic emulsion contains silver halide grains of the desired size, which are protected or surrounded by a small quantity of protective hydrophilic colloid, which is normally gelatin. However, there are also the by-products resulting from the various reactions in the formation of the silver halide as well as occasionally substances promoting the grain-growth, reducing substances, acids or ammonia, etc.

An emulsion having such a composition can hardly be coated on film, because the salts and other dissolved substances still present would crystallize during the drying stage and thus render the physical condition of the coated layer unsuitable or, in some cases, prevent the layer from drying completely. This is one of the reasons why the emulsion is subjected to a so-called "washing." This term is derived from the wet procedure adopted for the removal of by-products by diffusion.

The earliest and until recently the commonest method of removing the impurities was to cool the emulsion, usually after the addition of further quantities of gelatin and to make it set to form a fairly soft jelly. The jelly was broken up into small fragments, also called noodles, which were treated with water. The water being changed frequently accepted by osmosis out of the jelly the water-soluble by-products.

This process is very time- and water-consuming and requires special equipment, a fair amount of handling of the emulsion and will only result in the coating of rather dilute emulsions, thus having a rather low silver halide content.

Modern methods of emulsion washing are mostly based on the principle of causing the gelatin to coagulate. The density of the silver halide ensures that the gelatin-silver halide particles settle rapidly as a curd-like mass, from which the aqueous phase can be decanted easily. Unlike the classical setting and noodling technique wherein the excess salts are enclosed in the solid gelatin, from which they must then slowly diffuse during the washing process, in the precipitation technique, in optimum conditions, the volume of the coagulated emulsion parts is very small and by thorough separation of the aqueous phase from the curds a very high percentage of the unwanted salts can be removed in but one stage.

Sofar the removal of the aqueous phase containing the by-products has proceeded by decantation. Indeed, a filter technique or the use of a centrifuge cannot be applied because of the fact that the filter openings are clogging easily and in a centrifuge the curds are conglomerating, thus forming on the wall of the centrifuge basket a finer deposit that can be redispersed only with great difficulty.

The decantation technique is very time-consuming and requires much space for the installment of the decantation tanks.

There has now been found a process wherein the product(s) produced or used in the formation of a precipitate are separated from said precipitate without said disadvantages.

The present invention utilises the forces generated in a liquid vortex to concentrate the silver halide or other dispersion. To this end the dispersion is introduced continuously under pressure into a radially summetrical chamber provided with discharge outlets, so as to maintain within the chamber a liquid vortex, the discharge outlets being situated so that a dispersion more concentrated than the feed continuously discharges through at least one said outlet and liquid or a dispersion less concentrated than the feed continuously discharges through the other or through at least one other outlet.

A liquid vortex is in effect a body of liquid in rapid rotation with the angular velocity increasing inwardly from the outer layers of the body to the inner layers thereof surrounding the vortex core. Dispersed particles tend to accumulate in the outer layers and are discharged through one outlet of the chamber containing the vortex whereas a fraction of liquid moving towards the core under the centrepetal flow discharges through the other outlet.

The radially symmetrical chamber is preferably shaped so that it tapers towards one end and has opposed axial discharge apertures. Thus the chamber may be wholly or mainly of conical, conoidal or like shape with a tangential inlet or inlets at or near its wider end and opposed axial discharge apertures, one in the wider end and the other at the chamber apex.

As an alternative, a cylindrical or generally cylindrical chamber can be used, in which case one discharge opening will be located axially of the chamber at the end thereof at which the feed takes place and the other discharge opening will be located peripherally of the chamber at or near the other end thereof.

Radially symmetrical separating chambers of the kinds referred to are hereinafter alternatively referred to as "hydrocyclones." In the performance of the invention preference is given to the use of tapering hydrocyclones.

More than two discharge openings can be provided. For example in a tapering hydrocyclone there may be a discharge outlet located peripherally of the chamber medially of its length, but normally such an additional outlet is not necessary or desirable.

There may be more than one feed opening to the hydrocyclone. For example the hydrocyclons may have two or more tangential feed pipes.

Wash liquid can be introduced into the hydrocyclone simultaneously with the dispersion to be concentrated. For example, in the case of a hydrocyclone provided with two tangential feed pipes, the dispersion may be introduced through one of such pipes and the wash liquid may be introduced through the other of them. The effect of adding wash liquid is of course to reduce the concentration of the dissolved unwanted substances in the concentrated dispersion leaving the hydrocyclone.

The concentrated dispersion leaving the hydrocyclone can be subjected to further concentration in the same or another hydrocyclone. When the dispersion has to be washed it is however often preferable to add the wash liquid to the more concentrated dispersion discharging from the hydrocyclone and then to concentrate the resulting diluted dispersion by feeding it back into the same hydrocyclone or by feeding it into another hydrocyclone. In that case the concentrated dispersion resulting from the second concentration stage is not necessarily more concentrated than the dispersion obtained in the first concentration stage but the dispersion resulting from the second stage is cleaner, e.g., contains less or contains no dissolved unwanted substance(s).

When a dispersion is washed by introducing the dispersion and wash liquid into a hydrocyclone, the washing effect is not dependent on the discharge of a dispersion more concentrated than the initial dispersion fed to the hydrocyclone. Such concentration will normally be desirable but it is an advantage that the washing can take place at least without any substantial dilution of the initial dispersion; the initial dispersion becomes as it were temporarily diluted within the cyclone and its concentration becomes increased again prior to discharge. Accordingly, the present invention also includes a method of washing a dispersion of a solid precipitate in a liquid containing a dissolved substance or substances used or produced in the formation of such precipitate, which method comprises feeding the dispersion and wash liquid into a radially symmetrical chamber provided with discharge outlets, the feed of the dispersion and/or the said wash liquid being effected so as to maintain within the chamber a liquid vortex, and the said discharge outlets being situated so that a dispersion with a weaker concentration of dissolved substances than the dispersion fed to said chamber discharges through at least one said discharge outlet and wash water containing dissolved substances removed from the initial dispersion discharges through the other or through at least one other discharge outlet.

When the dispersion and wash liquid are fed into a hydrocyclone, they can both be introduced tangentially as already referred to above. Alternatively a vortex can be established by tangentially feeding the dispersion or the wash liquid, and the wash liquid or the dispersion as the case may be can be introduced into the vortex at or near its core, e.g., via a feed pipe intruding axially into the hydrocyclone chamber through the outlet opening at the feed end of the chamber.

A hydrocyclone will operate regardless of its orientation. Hereafter, in the following description of the invention, it is implicit that the or each hydrocyclone in view is a tapering hydrocyclone orientated with its apex pointing downwards but it should be kept in mind that other orientations are possible.

Preferred embodiments of the invention will now be further defined and described.

The invention includes a process wherein one product(s) produced or used in the formation of a precipitate are removed from said precipitate by the combination of the steps of:

1. diluting said product(s) with a solvent therefor, and
2. separating said product(s) from the precipitate in a passage-way by the use of centrifugal force created by the introduction of the liquid containing said product(s) and precipitate under pressure tangentially in a passage-way containing a zone of continuously decreasing diameter below the feed zone of tangential introduction and ending in a central outlet located in the zone of smaller diameters, the zone of introduction being provided with a central overflow opening through which liquid substantially freed from said precipitate is removed, the dilution of said product(s) being carried out by the addition of a solvent for said product(s) during the retransfer or transfer of said liquid containing the products and precipitate to the same or another such passage-way or simultaneously with the introduction of said liquid into the same or such another passage-way.

Especially when applied in the washing of flocculated hydrophilic colloid-silver halide emulsions the process of the invention possesses the advantage of operating very fast and without detrimental influence on the redispersion capability of the separated particles forming the flocculate.

The process of the present invention can be applied for the washing of the silver halide hydrophilic colloid flocculates obtained by different techniques of precipitation e.g. solvent precipitation, salt precipitation, precipitation by organic sulphonic acids or sulphates and the precipitation of acylated gelatin by the lowering of the pH.

The solvent precipitation is based on the addition of a water-miscible solvent in which the protective colloid, normally gelatin for the silver halide is not soluble. The commonest example is the use of industrial ethanol or methylated spirit when gelatin is applied. Because the emulsion is precipitated in a rather slimy form, the said method has been largely displaced by the other precipitation processes.

One of the preferred precipitation techniques is salt precipitation. The addition of large quantities of inorganic salts containing at least one doubly-charged entity, or smaller quantities of trebly or quadruply-charged ions causes the precipitation of the gelatin from the aqueous phase. For this type of precipitation preferably ammonium sulphate is used but a number of other inorganic salts e.g. nitrates may be applied also (see e.g. U.S. Pat. Nos. 3,153,593 of Alfons Jozef De Pauw issued Oct. 20, 1964, 3,007,796 of Ernst Albert Steigmann issued Nov. 7, 1961 and United Kingdom Pat. No. 1,008,694 filed May 8, 1962 by Gevaert Photo-Producten N.V.).

The addition of an organic sulphonic acid or sulphate will cause the acid group of the added compound to form a salt with the amino groups in the gelatin. The result of this chemical modification is that on the acid side of the isoelectric point the gelatin will no longer be soluble, because of salt formation, and if the group attached to the sulphonic or sulphate entity is hydrophobic the whole complex will be insoluble in water. Amongst the compounds used for this type of precipitation polystyrene sulphonic acid, naphthalene disulphonic acids, the long-chain alkyl sulphates, such as the well-known anionic wetting agents can be used (see e.g. United Kingdom Pat. No. 884,840 filed Oct. 16, 1958 by Agfa A.G.).

The use of acylated gelatin is an extension of the previous method in that instead of using an ionical-lybonded group attached to the amino group of the gelatin, the modification is introduced via a covalent bond. In the modified gelatin used as protective colloid for the silver halide the $-NH_2$ group will be replaced by a RCONH— or a R—$SO_2$NH— group wherein R represents a hydrophobic organic group.

For example the acylated gelatin used is obtained by reaction with phthalic anhydride, the amino groups being converted into the following group:

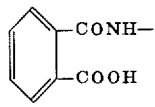

By lowering of the pH-value of an emulsion containing the acylated gelatin e.g. to 4, a fine, firm curd is precipitated, which can be separated easily from its liquid dispersing medium.

According to a preferred embodiment of the invention the quick separation of the precipitate from its liquid dispersing medium takes place in an apparatus which in one of its common structures may be described as a radially symmetrical chamber provided with one or more tangentially directed feed pipes near one end, a cover plate being provided at that end with an axially located circular discharge aperture. The latter discharge aperture is called the "Apex" discharge aperture, and the former discharge aperture is called the "overflow" aperture. The overflow aperture may be provided with a circular pipe, the so-called overflow pipe, extending axially into the chamber.

In the accompanying drawings, the FIGS. 1, 2, 3, 4, and 5 the apparatus and particular modifications thereof suitable for use according to the present invention and their arrangement in continuous flow systems are represented.

A suitable hydrocyclone is illustrated in FIG. 1, which is an elevational cross section of the hydrocyclone.

Referring to this figure, the hydrocyclone comprises a cylindrical portion 1 conjoined to a conical portion 4; 2 is the overflow and 6 is the apex aperture. The end 3 of the inlet pipe 7 opens tangentially into the cylindrical portion of the hydrocyclone. The overflow aperture is provided with an overflow pipe 5 ending below the inlet pipe 7.

It is well known that the efficiency of separating suspended particles from their liquid medium in a hydrocyclone depends on the pressure with which the liquid is tangentially fed, the shape and the dimensions of the hydrocyclone and of its inlet and outlet openings. Suitable feed pressures are comprised within the range of 1 to 7 kg/cm2. The liquid can be introduced under pressure by means of a proper pump or by pneumatic transport.

It has been established that experimentally optimal results are obtained with hydrocyclones having a fairly small apex angle ($\alpha$) e.g. 10° to 30°. The cross-sectional area of the feed aperture(s) is approximately one-third of the area of the overflow aperture.

The diameter of the hydrocyclone overflow aperture will be preferably less than one-third of the maximum diameter of the hydrocyclone.

For the purpose of washing silver halide-hydrophilic colloid flocculates according to the present invention hydrocyclones having an inlet opening with a diameter in the range of 2 to 10 mm and an apex outlet opening having a diameter in the range of 1 to 5 mm are used preferably.

FIG. 2 is a cross-sectional top view of a hydrocyclone, which has four feed apertures, connected to the feed pipes 8, 9, 10 and 11. The overflow opening is indicated by the number 2 and the apex opening by the number 6.

Through the feed pipes 8 and 10 the suspension is introduced under pressure and through the feed pipes 9 and 11 wash water is fed.

FIG. 3 gives a cross-sectional top view of a hydrocyclone having a tangentially introduced feed pipe with parallel openings. As a result of centrifugal force the particles of the suspension penetrate into the stream of wash liquid, which is fed at the periphery of the hydrocyclone through the pipe compartment 12. The suspension is fed more inwardly through the pipe compartment 13.

According to another embodiment the wash liquid stream and flocculate or coagulate stream are combined in one inlet just before tangential introduction in the hydrocyclone. In FIG. 4 a combination of a hydrocyclone and a wash tank is illustrated.

From the tank 14 the flocculate of silver halide and hydrophilic colloid is pumped into the hydrocyclone 15. The pump 16 is interconnected between the tangentially directed feed pipe 17 and the upwardly directed feed pipe 18. At the bottom the feed pipe 18 is provided with a valve 19 and connected just below the liquid level in the tank 14 to two sidewardly directed inlet pipes 20 containing the inlet valves 21. Fresh water is sprayed into the tank through a plurality of spray nozzles 22 connected to the washwater feed line 23 that is provided with a valve 24.

Liquid freed from the flocculate is continuously evacuated through the overflow 25, and during the washing the concentrated flocculate is reintroduced into the wash tank through the apex opening pipe 26 that is provided with a regulating valve 27 and a sidewardly directed discharge pipe 28 having in its turn a regulating discharge valve 29. During the washing operation the valves 19 and 29 are closed and the valves 21, 24, and 27 are open. At the moment the wash water leaving the overflow 25 possesses the desired electrical conductivity indicating a sufficiently low concentration of the byproduct salts the valves 21, 24, and 27 are closed and simultaneously the valves 19 and 29 are opened. The washed flocculate leaves the hydrocyclone through the pipe 28 and is ready for redispersion and further treatment in the preparation of a light-sensitive silver halide photographic material.

Figure 5:
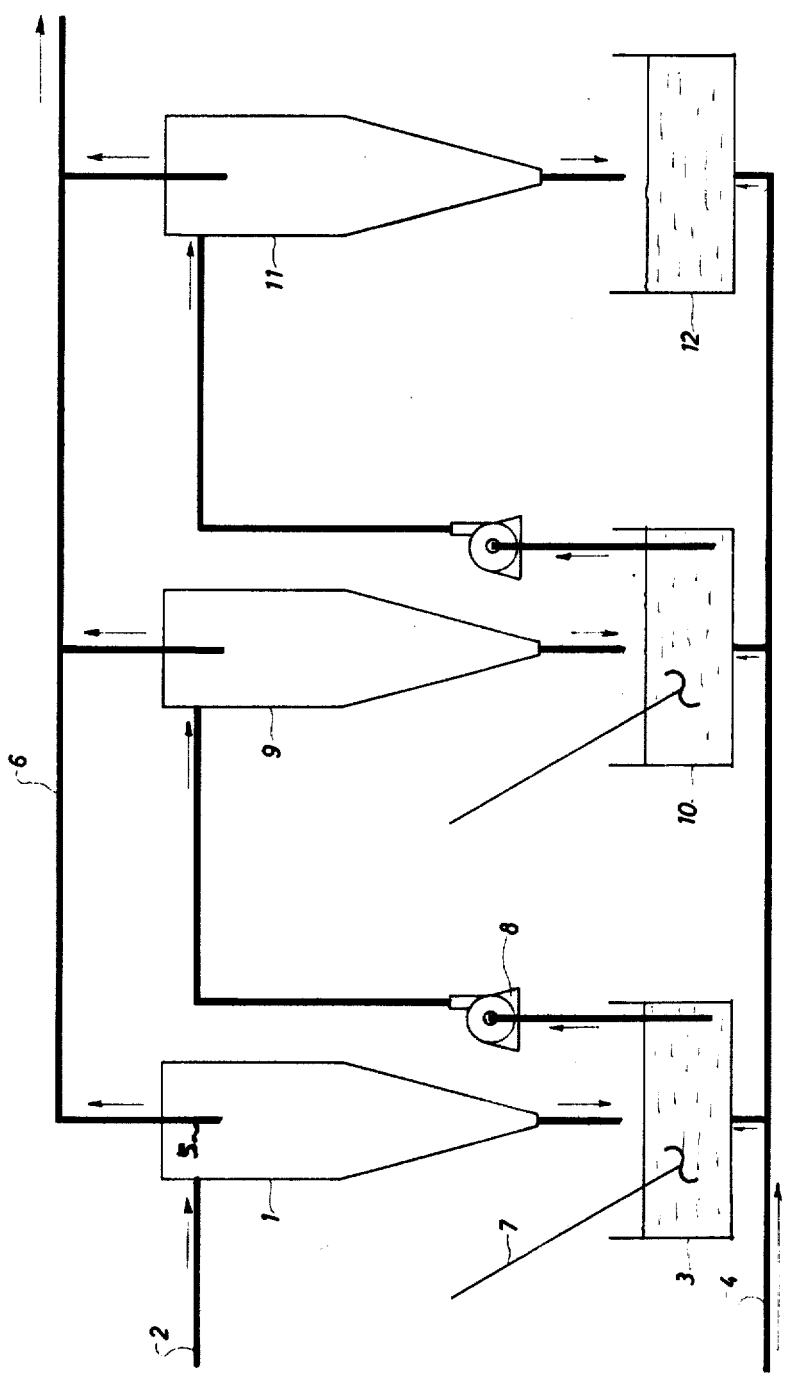

FIG. 5 represents a cascading connection of three hydrocyclones combined with two wash tanks. This cascading connection is suited for introduction in a process for continuous silver halide emulsion preparation in which from the emulsification to the coating all operations are carried out on a liquid body moving continuously from the emulsification stage zone to the coating stage zone. The flocculate suspension with the dissolved by-products of the silver halide preparation are fed with pressure into the first hydrocyclone 1 through the tangential feed pipe 2. The concentrated flocculate already substantially freed from dissolved by-products is discharged into the wash tank 3, wherein it is mixed with fresh wash water introduced through the feed line 4. The overflow 5 of the liquid containing the by-products is connected to a common drain 6.

In the wash tank 3 a stirrer 7 provides a thorough circulation of the flocculate so that the wash water can easily penetrate into the curds. A pump 8 introduces under pressure the washed flocculate into a second hydrocyclone 9 which in its turn discharges again concentrated and washed flocculate into a second wash tank 10. In tank 10 the silver halide flocculate is pumped with its wash water into a third hydrocyclone 11 from which it is finally discharged in a tank 12 in which the further addition of gelatin and the chemical sensitization of the silver halide may take place.

According to a preferred embodiment of the present invention the operating conditions for the separation of the flocculate from its dissolved by-products are such that the volume ratio of the liquid leaving the apex opening and the overflow opening is at most 1/100. Working in such conditions means that normally only one washing (dilution) with a same initial quantity of liquid is required for the production of sufficiently pure silver halide flocculates. An even lower volume ratio such as 1/200 can be obtained in a hydrocyclone having a cylindrical part with a diameter and height of 5 cm and a conical part having an angle of 10°, the feed opening diameter being 4 mm, the overflow opening diameter 9 mm and the apex opening diameter being 1 mm. The feed pressure applied for obtaining the said ratio is kept at 4 kg per sq. cm.

The volume ratio of 1/200 opens the way for the production of silver halide materials without washing of the curds.

Indeed, some silver halide emulsions that are prepared for application onto a paper base do not require a very extensive removal of soluble by-products and may dispense with a high-degree washing.

It is possible to economize on the amount of the applied precipitant or flocculating agent e.g. ammonium sulphate and other salts such as sodium, potassium, and magnesium sulphates and nitrates of group IV of the periodic table of the elements, which includes tin, lead, titanium, cerium, thorium, zirconium and germanium, since the separation in the hydrocyclone occurs so fast in comparison with the decantation system that a less intensive hardening of the hydrophilic colloid to prevent dissolution during washing has to take place.

Further it should be noted that dodecyl sulphate, which is a known dehydrating agent for gelatin-silver halide particles and which could not be removed sufficiently sofar the flocculate by conventional decantation washing, is now removed in the hydrocyclone separator to such a high degree that it does no longer require an additional washing or dilution with alcohol.

In the hydrocyclone the light-sensitive silver halide can be handled easily in the dark in a very small operation room. The hydrocyclone can be equipped with all the facilities of modern continuous process control, such as pH-measurement, turbidity, and conductivity measurement, pressure and temperature control.

The following examples illustrate the present invention without, however, limitng it thereto.

EXAMPLE 1

300 parts of silver nitrate were dissolved in 2900 parts of distilled water and with vigourous stirring at 40°C, added in 2 min. to a solution of 250 parts of potassium bromide, 45 parts of gelatin, and 5 parts of potassium iodide in 1200 parts of water (emulsification).

After the physical ripening, which was carried out at 45°C for 30 min., 1400 parts of a 50 percent aqueous solution of ammonium sulphate were added with vigourous stirring. The silver bromide and gelatin immediately separated as a fine powder. During the flocculation the pH of the solution was 7-7.5.

The resulting flocculate was divided into three portions and freed by decantation from an amount of supernatant liquid in a degree that samples were left containing respectively an amount of silver halide expressed as silver nitrate of A. 170 g of AgNo₃ per liter,
B. 147 g of AgNO₃ per liter, and
C. 30.3 g of AgNo₃ per liter.

In the following table 1 the characteristics of the hydrocyclone, the operating conditions, and the separation results are listed.

Table 1

| Flocculate | D | V | $C_V$ | A | $C_A$ | F | $C_F$ | P |
|---|---|---|---|---|---|---|---|---|
| A | 11.1 | 6 | 170 | 4 | 647 | 10 | 0.21 | 0.5 |
| B | 11.1 | 6 | 147 | 4 | 685 | 10 | 0.09 | 1.0 |
| C | 13.5 | 4 | 30.3 | 1 | 577 | 9 | 0.015 | 4.0 |

D = volume of introduced flocculate feed in liter per min.
V = diameter in mm of the tangential feed opening.
$C_V$ = concentration of silver halide expressed in grams of AgNO₃ per liter in the feed.
A = diameter in mm of the apex opening.
$C_A$ = concentration of silver halide expressed in grams of AgNO₃ per liter in the flocculate leaving the apex opening.
F = diameter in mm of the overflow opening.
$C_F$ = concentration of silver halide expressed in grams of AgNO₃ per liter in the liquid leaving the overflow opening.
P = feed pressure in kg per sq.cm.

D = volume of introduced flocculate feed in liter per min.
V = diameter in mm of the tangential feed opening.
$C_V$ = concentration of silver halide expressed in grams of AgNO₃ per liter in the feed.
A = diameter in mm of the apex opening.
$C_a$ = concentration of silver halide expressed in grams of AgNO₃ per liter in the flocculate leaving the apex opening.
F = diameter in mm of the overflow opening.
$C_F$ = concentration of silver halide expressed in grams of AgNO₃ per liter in the liquid leaving the overflow opening.
P = feed pressure in kg per sq.cm.

The apex opening angle of the hydrocyclone was 10°.

When the hydrocyclone separation was repeated with the concentrated flocculates A and B, to which fresh water had been added in an amount sufficient to attain the initial silver halide concentration of samples A and B again, washed samples of silver halide-gelatin flocculates were obtained, which were almost free of by-product salts formed in the emulsification step and of ammonium salt used in the flocculation step.

The concentrated flocculation sample C needed no further washing for being usable in photographic paper type materials since the concentration of remaining dissolved salts was already below the acceptable level for obtaining a silver halide emulsion photographic material with a sufficiently long shelf life.

EXAMPLE 2

Silver halide emulsions prepared analogously to the one described in Example 1 and containing in the silver halide gelatin flocculates A and B obtained by ammonium sulphate precipitation an amount of silver expressed in silver nitrate of 16 g/l were substantially freed from dissolved salts in a hydrocyclone having the following characteristics and yielding separation results as given in Table 2 (for the definition of the symbols see Example 1).

Table 2

| Flocculate | D | V | $C_I$ | A | $C_A$ | F | $C_F$ | P |
|---|---|---|---|---|---|---|---|---|
| A | 14.5 | 4 | 16 | 1 | 790 | 9 | 0.06 | 4.5 |
| B | 14.0 | 3 | 16 | 1 | 650 | 9 | 0.065 | 4.5 |

The angle of the apex opening was 10°.

EXAMPLE 3

30 liters of a silver halide emulsion flocculate prepared by ammonium sulphate precipitation and containing ⅝ mole of silver nitrate per liter, having a gelatin-silver nitrate ratio of 0.15 and 6 percent by weight of ammonium sulphate were subjected to a wash treatment as illustrated in FIG. 4.

The 30 liters were introduced in a wash tank 14 and during a first operation 4/5 of said 30 liters were fed into the hydrocyclone 15 without addition of wash water through the spray nozzles 22. Thereupon 50 liters of wash water were introduced gradually into the wash tank 14 through the spray nozzles 22 while the pump 16 kept feeding the hydrocyclone 15. After a working period of only 7 min. the liquid leaving the overflow 25 had obtained an electrical resistivity being 95 percent of that of the wash water.

The hydrocyclone used had a cylindrical part 1 (see FIG. 1) of 50 mm diameter, a tangential feed opening 7 of 4 mm diameter, an overflow opening 5 of 9 mm diameter, and an apex opening 6 of 2 mm. The apex angle ($\alpha$) was 10°.

The liquid was fed into the hydrocyclone with a pressure of 4 kg per sq.cm and at a rate of 810 liters per hour.

A batch process operating with the same amount of starting flocculate using a decantation tank, into which 4 times 24 liters of wash water were introduced, took 1½ for the four decantations and four drain-off operations of supernatant liquid with a siphon to a 6th of the volume, to obtain the same result of flocculate washing as offered by the above hydrocylone washing operation.

I claim:

1. In a method of preparing a photographic silver halide emulsion comprising the steps of:
    1. forming an emulsion of silver halide by reacting a water-soluble silver salt and a water-soluble halide in an aqueous solution of a protective hydrophilic colloid to produce silver halide grains suspended in said colloid solution,
    2. treating the thus formed emulsion with an inorganic flocculating salt to produce a curd-like flocculate of the colloid around the silver halide grains,
    3. separating the flocculate from a substantial portion of the solution containing the water-soluble salts present after the initial emulsion-forming step and the dehydrating or precipitating agent used for said flocculation step, the improvement of effecting the flocculate separation by:
    a. introducing at least one stream of said flocculate-containing solution under pressure into a zone defined by a wall having the shape of a body of revolution, each such stream being introduced through a generally tangentially extending inlet port in said wall, wherein said solution is subjected to vortical flow in said zone,
    b. withdrawing as a stream from said zone at a locus in the interior thereof spaced away from said wall a liquid fraction being substantially free of said flocculate, and
    c. removing a stream of flocculate-containing solution from a locus adjacent said wall.

2. The method of claim 1 wherein said flocculating salt is ammonium sulfate.

3. The method of claim 1 wherein said flocculate is introduced into said zone in admixture with washwater.

4. The method of claim 1 wherein said flocculate-containing solution is introduced under a pressure within the range of about 1–7 kg/cm² and said substantially flocculate-free fraction is withdrawn from said zone at a volume at least 100 times the volume at which the flocculate-containing solution is removed therefrom.

5. The method of claim 1 wherein said zone extends axially of said tangential inlet port with the diameter thereof decreasing downstream of said port, terminating in a central outlet opening for removal of the flocculate-containing stream, and is provided with a central overflow opening generally in the region of said tangential inlet port for withdrawal of said flocculate-free stream.

6. The method of claim 4 wherein said zone extends axially of said inlet port with its diameter decreasing downstream of said port and terminating in an axial outlet port at its lower end, said inlet opening having a diameter in the range of about 2–10 mm and said axial outlet opening having a diameter in the range of about 1–5 mm.

7. The method of claim 6 wherein the downwardly decreasing diameter portion of said zone has a generally conical shape with an included angle of about 10°–30°.

8. A method according to claim 1, wherein said zone is the interior of a hydrocyclone provided with at least one tangentially directed feed pipes near one end, and a cover plate for such and, said cover plate having axial discharge aperture therein, and the other end of said hydrocyclone being tapered and terminating in a further axial outlet aperture.

9. A method according to claim 8, wherein the discharge aperture is the opening of a conduit projecting axially into said interior just below the tangential feed pipe opening.

10. A method according to claim 1 wherein said body of revolution includes a conical section tapering in a direction along said axis of said zone away from such inlet port, said conical section terminating in an axial opening of reduced cross-sectional area through which said stream of flocculate-containing solution is removed.

11. A method according to claim 10 wherein the wall of said conical section is inclined at an angle of up to about 15° with respect to the axis thereof.

12. A method according to claim 1 wherein a stream of aqueous liquid free of said flocculate is introduced into said zone in a further tangentially extending port to dilute the flocculate containing solution before separation of said liquid fraction.

* * * * *